United States Patent [19]

Kelly, Jr. et al.

[11] Patent Number: 5,382,617
[45] Date of Patent: Jan. 17, 1995

[54] STABILIZATION OF POLY(HYDROXY ACID)S DERIVED FROM LACTIC OR GLYCOLIC ACID

[75] Inventors: William E. Kelly, Jr.; Richard L. Baird, both of Wilmington, Del.

[73] Assignee: E. I. Du Pont de Nemours and Company, Wilmington, Del.

[21] Appl. No.: 107,646

[22] Filed: Aug. 20, 1993

[51] Int. Cl.⁶ ............................................. C08K 3/38
[52] U.S. Cl. ..................... 524/405; 524/183; 524/599; 525/450
[58] Field of Search ............. 524/183, 405, 599; 525/450; 528/354, 359, 361; 523/126

[56] References Cited

U.S. PATENT DOCUMENTS

| | | | |
|---|---|---|---|
| 3,099,677 | 7/1963 | Hunter | 260/462 |
| 3,193,521 | 7/1965 | Jasching | 524/184 |
| 3,598,787 | 8/1971 | Herwig et al. | 524/184 |
| 4,021,464 | 5/1977 | Mayerhoefer et al. | 524/184 |
| 4,231,895 | 11/1980 | Dworkin | 524/184 |
| 4,686,245 | 8/1987 | Nelson | 524/184 |
| 5,028,667 | 7/1991 | McLain et al. | 528/354 |
| 5,076,983 | 12/1991 | Loomis et al. | 528/354 |
| 5,208,297 | 5/1993 | Ford et al. | 528/354 |
| 5,231,148 | 7/1993 | Kleinke et al. | 525/450 |
| 5,234,977 | 8/1993 | Bastioli et al. | 524/405 |
| 5,300,576 | 4/1994 | Nemphos et al. | 525/450 |

FOREIGN PATENT DOCUMENTS

| | | |
|---|---|---|
| 449059 | 10/1991 | European Pat. Off. |
| 04-198256 | 7/1992 | Japan . |
| 1244168 | 2/1991 | United Kingdom . |

OTHER PUBLICATIONS

S. Gogolewski et al., Polymer Degradation and Stability, vol. 40, pp. 313–322, 1993.

K. Jamshidi, et al., Polymer, vol. 29, pp. 2229–2234, 1988.

*Primary Examiner*—Veronica P. Hoke

[57] ABSTRACT

Stabilization of poly(hydroxy acid)s, particularly poly(lactic acid), to thermal processing with selected boron compounds is disclosed. The most preferred stabilizer is boric oxide ($B_2O_3$).

23 Claims, No Drawings

STABILIZATION OF POLY(HYDROXY ACID)S DERIVED FROM LACTIC OR GLYCOLIC ACID

FIELD OF THE INVENTION

This invention relates to poly(hydroxy acid)s. In particular this invention relates to the stabilization of poly(hydroxy acid)s to thermal processing with selected boron compounds.

BACKGROUND OF THE INVENTION

Polymers and copolymers of hydroxy acids, generally known as poly(hydroxy acid)s, slowly hydrolyze and biodegrade to environmentally benign products. These materials are well behaved thermoplastics with appealing aesthetic qualities. Consequently, high molecular weight poly(hydroxy acid)s (molecular weight of at least 10,000 and normally 15,000 to 500,000), particularly polymers and copolymers of lactic acid and glycolic acid, are potential replacements for poly(styrene) and other non-biodegradable polymers in numerous applications, especially packaging.

Poly(hydroxy acid)s degrade extensively during processing at 180 C. and above, especially when the polymer has not been thoroughly dried and maintained in a dry environment during processing. Both weight loss and molecular weight reduction occur. Poly(lactic acid), for example, undergoes a dramatic decrease (50–88%) in molecular weight during injection molding at 130–215 C. (S. Gogolewski, et al, Polymer Degradation and Stability, 40, 313–22, 1993).

Hydrolysis, depolymerization and cyclic oligomerization, and intermolecular and intramolecular transesterification were observed when poly(lactic acid) was heated above 190 C. (K. Jamshidi, et al, Polymer, 29, 2229–2234, 1988). Trace amounts of stannous octoate polymerization catalyst were shown to have a strong effect on thermal degradation. The melting temperature of crystalline poly(L-lactic acid) was reported to approach 184 C. as molecular weight increased, indicating that poly(L-lactic acid) must generally be thermally processed near the temperature at which it thermally degrades.

The limited thermal processibility of poly(hydroxy acid)s, especially poly(lactic acid) and its copolymers, severely limits their applications, particularly as replacements for non-biodegradable polymers. A need exists for poly(hydroxy acid)s that with improved stability to thermal processing conditions.

SUMMARY OF THE INVENTION

The invention is a composition with improved thermal stability, said composition comprising:
(A) a poly(hydroxy acid); and
(B) an effective amount of a thermal stabilizer, the stabilizer selected from the group consisting of: boric oxide; boric acids; borate esters of the structure $(R_1O)(R_2O)(R_3O)B$, wherein $R_1$, $R_2$, and $R_3$ are alkyl or aryl groups that together contain a total of eighteen or fewer carbon atoms; boroxines of the structure $(R_4O)(R_5O)(R_6O)B_3O_3$ wherein $R_4$, $R_5$, and $R_6$ are alkyl or aryl groups that together contain a total of eighteen or fewer carbon atoms; polyborate esters wherein the alkoxy groups contain five or fewer carbon atoms and borate salts.

Preferred poly(hydroxy acid) are: poly(lactic acid); poly(glycolic acid); copolymers of lactic and glycolic acid; and copolymers containing lactic acid and/or glycolic acid copolymerized with up to 30% by weight of an additional hydroxy acid. The most preferred stabilizer is boric oxide.

DETAILED DESCRIPTION OF THE INVENTION

The invention is a poly(hydroxy acid) composition with improved thermal stability. Stability is enhanced by addition of an effective amount of a boron compound. Boron compounds are discussed in the Encyclopedia of Chemical Technology, Fourth Edition, Volume 4, Wiley, New York, 1992, pp 365–423.

Preferred stabilizers include boric oxide ($B_2O_3$), metaboric acid ($HBO_2$), orthoboric acid ($H_3BO_4$), and mixtures thereof. Boric oxide, also known as boron trioxide, boric anhydride, and anhydrous boric acid, is mildly hydroscopic and can take up water to form orthoboric acid (also known as boric acid). Orthoboric acid, when heated above 100 C., can lose water and form metaboric acid. Consequently, more than one material may be present in any one composition. The most preferred stabilizer is boric oxide.

Borate esters of the structure $(R_1O)(R_2O)(R_3O)B$, in which $R_1$, $R_2$, and $R_3$ are substituted or unsubstituted alkyl or aryl groups that together contain a total of eighteen or fewer carbon atoms are effective stabilizers of poly(hydroxy acid)s. Since the borate ester should remain in the polymer both before and during thermal processing, its molecular weight should be high enough that it does not readily vaporize from the polymer. However, as the molecular weight of the ester increases, the relative amount of boron in the added ester decreases and it becomes necessary to add larger amounts of ester to produce the same concentration of boron.

Preferred borate esters are those that comprise six to fifteen carbon atoms. Typical preferred borate esters include: triethyl borate, tri-n-propyl borate, tri-i-propyl borate, tri-n-butyl borate, tri-s-butyl borate, tri-t-butyl borate, tri-n-pentyl borate, tri-i-pentyl borate, tricyclopentyl borate, etc.

Boroxines (cyclic trimers that may be prepared by reaction of a molar excess of boric oxide with metaborate esters) of the structure $(R_4O)(R_5O)(R_6O)B_3O_3$ in which $R_4$, $R_5$, and $R_6$ are substituted or unsubstituted alkyl or aryl groups that together contain a total of eighteen or fewer carbon atoms may be used as thermal stabilizers for poly(hydroxy acid)s. Boroxines may be produced by the reaction of equimolar amounts of a borate ester and boric oxide. Typical boroxines include: trimethoxyboroxine, triethoxyboroxine, tri-n-propoxyboroxine, tri-i-propoxyboroxine, tri-n-pentoxyboroxine, triphenoxyboroxine, etc.

As is the case with borate esters, the boroxine should remain in the polymer both before and during thermal processing, so its molecular weight should be high enough that it does not readily vaporize from the polymer. However, as the molecular weight of the boroxine increases, the relative amount of boron in the added boroxine decreases and it becomes necessary to add larger amounts of boroxine to produce the same concentration of boron. Preferred boroxines contain three to fifteen carbon atoms.

Polyborate esters may used as thermal stabilizers for poly(hydroxy acid)s. Like the boroxines, these compounds contain aryloxy and/or alkoxy groups attached to six membered boron/oxygen rings. As described by Hunter, U.S. Pat. No. 3,099,677, these compounds may be prepared by reaction of a molar excess of boric oxide with a metaborate ester at a temperature in the range of 70-150 C. To produce polyborate esters that are soluble in organic solvents, ratios in the range of 1.1-2.0 moles of boric oxide per mole of metaborate ester were preferred. Use of more than 2 moles of boric oxide per mole of metaborate ester produces compounds with more limited solubility in organic solvents due to the higher proportion of boron and oxygen present.

To minimize the amount of thermal stabilizer required, the polyborate should contain a large proportion of boron. Therefore polyborates containing alkoxy groups that contain five or fewer carbon rooms are preferred. Those in which the alkoxy groups contain one or three carbon atoms are more preferred. The molar ratio of boric oxide to metaborate ester will depend on the properties desired. If solubility in organic solvents is desired, a ratio of two or less will be used. If higher portions of boron are desired, a higher ratio, such as 3 or higher, will be used to prepare the polyborate. Although solubility in organic solvents is preferred if the stabilizer is to be added to the poly(hydroxy acid) by codissolving both the stabilizer and poly(hydroxy acid) is a solvent and evaporating the solvent, solubility in organic solvents is not required for efficient stabilization.

Other stabilizers include borate salts. Examples include: metaborate salts, such as sodium metaborate and disodium tetraborate; and sodium tetraphenyl borate.

Poly(hydroxy acid)s are typically prepared by the catalyzed ring opening polymerization of the cyclic ester (lactone) or the dimeric cyclic ester of the monomer. Copolymers are typically prepared by catalyzed copolymerization of two or more cyclic esters and/or dimeric cyclic esters. Because of their manner of preparation poly(lactic acid) and poly(glycolic acid) are sometimes referred to as poly(lactide) and poly(glycolide), respectively. The polymers of the hydroxy acids that form cyclic esters are sometimes referred to as polymers of the corresponding lactone, i.e., poly($\epsilon$-caprolactone), etc.

Typical monomers are: glycolide (1,4-dioxane-2,5-dione), the dimeric cyclic ester of glycolic acid; lactide (1,4-dioxane-3,6-dimethyl-2,5-dione), the dimeric cyclic ester of lactic acid; $\beta$-propiolactone, the cyclic ester of 3-hydroxypropanic acid; $\alpha$, $\alpha$-dimethyl-$\beta$-propiolactone, the cyclic ester of 2,2-dimethyl-3-hydroxypropanic acid; $\beta$-butyrolactone, the cyclic ester of 3-hydroxybutyric acid; $\delta$-valerolactone, the cyclic ester of 5-hydroxypentanoic acid; $\epsilon$-caprolactone, the cyclic ester of 6-hydroxyhexanoic acid, and the lactones of its methyl substituted derivatives, such as 2-methyl-6-hydroxyhexanoic acid, 3-methyl-6-hydroxyhexanoic, 4-methyl-6-hydroxyhexanoic acid, 3,3,5-trimethyl-6-hydroxyhexanoic acid, etc.; dodecalactone, the cyclic ester of 12-hydroxydodecanoic acid; and 2-p-dioxanone, the cyclic ester of 2-(2-hydroxyethyl)-glycolic acid.

The preferred poly(hydroxy acid)s are: poly(lactic acid); poly(glycolic acid); copolymers of lactic and glycolic acid; and copolymers containing lactic acid and/or glycolic acid copolymerized with up to 30% by weight of an additional hydroxy acid, such as those listed above. The most preferred poly(hydroxy acid) is poly(lactic acid).

Lactide is prepared by: (1) polymerizing lactic acid to an oligomer, i.e., a relatively low molecular weight poly(lactic acid), (2) heating the oligomer, generally in the presence of a catalyst, to depolymerize it to lactide, (3) recovering and purifying the lactide. See, for example: Lowe, U.S. Pat. No. 2,668,162; Bhatia, U.S. Pat. Nos. 4,835,293 and 5,023,349; DeVries, U.S. Pat. No. 4,797,468; and Muller, U.S. Pat. No. 5,053,522. Lactide may exist in any of four forms: D—, also known as D,D—; L—, also known as L,L—; D,L—; and racemic.

Polymerization of cyclic esters and dimeric cyclic esters catalyzed by tin compounds is disclosed in: Young, U.S. Pat. No. 2,890,208; Blood, U.S. Pat. No. 3,645,941; and Versfelt, U.S. Pat. No. 3,839,297. Tin compounds, such as stannous 2-ethylhexanoate (tin octoate) and other esters of tin(II) with carboxylic acids containing up to 18 carbon atoms as well as tetraphenyl tin, are well known lactide polymerization catalysts. Polymerization with tin oxides is described in H. R. Kricheldorf and A. Serra, Polymer Bulletin, 14, 497-502 (1985). Polymerization of lactide with tin octoate is described in J. W. Leenslag and A. J. Pennings, Makromol. Chem. 188, 1809-1814 (1987). Typically about 0.01-1% by weight of tin catalyst is used.

Polymerization by yttrium compounds and by rare earth compounds has also been described. Polymerization of lactide with catalysts such as yttrium tris(methyl-S-lactate) and samarium tris(2-N,N-dimethylaminoethoxide), is described in McLain, U.S. Pat. No. 5,028,667. Polymerization of lactide with lanthanum bis(2,2,6,6-tetramethylheptane-3,5-dionato)-i-propoxide is described in Ford, U.S. Pat. No. 5,208,297. Polymerization of lactide with ether complexes such as the lanthanum tris(2,2,6,6-tetramethylheptanedionate) diethyleneglycol diethylether complex is described in Ford, PCT Application PCT/US92/11309. Traces of metal catalysts normally remain in the poly(hydroxy acid) since it is generally not economic to remove them. The stabilizers of the invention are most effective in poly(hydroxy acid)s than contain traces of polymerization catalyst.

Poly(hydroxy acid)s may be processed above their melt temperatures by numerous standard thermoplastic processing techniques. These techniques include: injection molding, extrusion, blow molding, fiber spinning, compounding, etc. These techniques are well known to those skilled in the art and have been described in many references, for example, Fundamental Principles of Polymeric Materials, 2nd ed, S. L. Rosen. Wiley, New York, 1993. Extrusion is described in Encyclopedia of Polymer Science and Engineering, Vol. 6, Wiley, New York, 1986, pp. 571-631.

Typically, the poly(hydroxy acid) is heated in a single or twin screw extruder and compounded with plasticizers, colorants, fillers, and other additives normally added to plastics. In can then be extruded as a film. filament or sheet or used to prepare coated materials such as coated cardboard. It can also be injection molded to prepare shaped plastic parts or blow extruded to form blown films or foamed objects. Other heating and mixing equipment such as Banbury, Brabender, or other intensive mixers are also used, especially for mixing and compounding. The exposure of the polymer to heat and agitation can vary from a few seconds to several hours depending on the operation and excursions occurring in normal operations when upsets in one part of a multistep operation require holdup of some or all of the polymer at elevated temperature. In some operations, such as film extrusion, variation of the molecular weight with time of heating can lead to variation in film thickness and other problems associated with film manufacture.

Methods for processing poly(lactic acid) can be determined from an initial evaluation and should be within the general operational guidelines for operation of the equipment selected for processing. Generally, poly(lactic acid) can be processed at temperatures in the range of 155–190 C. with the application of moderate shear to effect melt processing. Exposure to temperatures above 210 C. for long time periods, i.e., greater than about 30 minutes, should be avoided.

During thermal processing the poly(hydroxy acid) is may be heated at 130–215 C. for 10 seconds to 2 hours, typically 155–185 C. for 3 to 15 minutes. An amount of stabilizer effective to stabilize the poly(hydroxy acid) to the thermal processing conditions should be added to the polymer. This amount of stabilizer depends on the stabilizer added, the poly(hydroxy acid), and the thermal processing conditions to which the poly(hydroxy acid) is to be subjected. For convenience, the amount of stabilizer added can be expressed as the amount of boron added/Kg of polymer. It should be understood this refers to the amount of chemically combined boron present in the stabilized polymer. It does not mean that elemental boron has been added to the poly(hydroxy acid).

Significant stabilization can be obtained with stabilizer levels as low as about 0.04 moles of boron/Kg of poly(hydroxy acid) (corresponding to the addition of about 0.14% by weight of $B_2O_3$). Depending on the poly(hydroxy acid), the thermal processing conditions and the amount of stabilization required, this level of stabilizer may provide adequate stabilization. Higher levels may be used for stabilization to more stringent thermal processing conditions. Addition of up to about 1.75 moles of boron/Kg of poly(hydroxy acid) (corresponding to the addition of about 6.1% by weight of boric oxide) may be added if necessary to achieve the desired stabilization. Preferably about 0.1 mole of boron/Kg of poly(hydroxy acid) to about 1.0 mole of boron/Kg of poly(hydroxy acid) will be added. It has been observed that higher levels of stabilizer are required if higher levels of residual polymerization catalyst are present in the poly(hydroxy acid). It has also been observed that higher levels of stabilizer are required to stabilize poly(hydroxy acid)s containing residues of tin polymerization catalysts than are required to stabilize polymers containing residues of lanthanum and rare earth polymerization catalysts.

Solid boron compounds, such as boric oxide, may be added to the poly(hydroxy acid) by physically blending the boron compound with the polymer. For example, the materials may be ground together. Alternatively, powered boron compound and powered poly(hydroxy acid) may be mixed by any common mixing technique, such as shaking the materials together for the time necessary to achieve good mixing.

Mixing may also be achieved by dissolving the poly(hydroxy acid) and the boron compound in a solvent and evaporating the solvent. The choice of solvent will depend on the poly(hydroxy acid) and the stabilizer chosen. Although any solvent in which the boron compound and the poly(hydroxy acid) are soluble may be used, the use solvents that contain a significant proportion of hydroxylic solvents, such as alcohols, glycols, glycol monoethers, etc., that can degrade the poly(hydroxy acid), should be avoided. Glycols, in particular, should be avoided since they appear to adversely affect the stabilizer as well. A volatile solvent, such as dichloromethane, should be used so that it can be easily removed without subjecting the poly(hydroxy acid) to extensive thermal stress. In cases in which the stabilizer is not soluble in the desired solvent, the poly(hydroxy acid) may be dissolved in the solvent, the resulting solution mixed with the stabilizer, and the solvent evaporated.

Industrial Applicability

Because poly(hydroxy acid)s are degraded biologically and hydrolytically to physiologically and environmentally acceptable materials, they are useful in biomedical and other applications. They are also potential replacements for poly(styrene) and other non-biodegradable polymers in numerous applications, especially packaging.

The advantageous properties of this invention can be observed by reference to the following examples which illustrate, but do not limit, the invention.

EXAMPLES

Example 1

This example illustrates the stabilization of poly(hydroxy acid)s by boron compounds.

Poly(lactic acid) was prepared by melt polymerization of lactide at 180 C. using a lanthanum tris(2,2,6,6-tetramethylheptanedionate) diethyleneglycol diethylether complex as generally described in Ford, PCT Application PCT/US92/11309. L-Lactide and D-lactide were mixed in the indicated ratio prior to polymerization. Residual lactide content was measured by nuclear magnetic resonance. Molecular weights, determined by gel permeation chromatography in tetrahydrofuran relative to poly(styrene) standards, were: $M_w$, about 120,000; and $M_n$, about 45,000.

Samples were prepared for analysis by rolling 0.3–1.0 g of poly(lactic acid) pellets in sufficient dichloromethane to give a 10% by weight solution of the polymer. Rolling was carried out in 20 mL screw cap vials until complete solution was obtained. The borate compound was added to the solution as either a neat liquid or as a solution (5–10% in absolute ethanol) using a Hamilton microsyringe. The solution was rolled for an additional 20 min and cast into a small aluminum pan (63×17.5 mm). Solvent was removed by heating overnight in a vacuum oven at 75 C. at 23,000 Pa. The resulting polymer film was cut into pieces small enough to fit into a platinum thermogravimetric analysis pan.

Weight loss was measured by heating the sample at 200 C. in a nitrogen atmosphere, using a Du Pont Instruments Model 951 Thermogravimetric Analyzer. Samples were placed in the analyzer at room temperature and heated at 20 C./min to 200 C. and then held at 200 C. for 1 hr. Weight loss/rain, determined from the slope of the linear portion of the plot, generally covering 50–75% of the curve, is given in Table 1.

TABLE 1

| L:D Ratio | Residual Lactide | Stabilizer | Amt. Added (% by wt)[a] | Weight Loss[b] |
|---|---|---|---|---|
| 100:0 | 5.24% | None | 0 | 71.4 |
| " | " | n-Butyl borate | 3.20 | about 0 |
| " | " | n-Butyl borate | 6.40 | 5.8 |
| " | " | Boric oxide | 0.48 | 7.0 |
| " | " | Boric oxide | 0.97 | 4.2 |

TABLE 1-continued

| L:D Ratio | Residual Lactide | Stabilizer | Amt. Added (% by wt)[a] | Weight Loss[b] |
|---|---|---|---|---|
| 99:1 | 8.55% | None | 0 | 140 |
| " | " | n-Butyl borate | 3.20 | 18.6 |
| " | " | n-Butyl borate | 6.40 | 13.5 |
| " | " | Boric oxide | 0.48 | 20.9 |
| " | " | Boric oxide | 0.97 | 12.6 |
| 98:2 | 4.78% | None | 0 | 287 |
| " | " | n-Butyl borate | 3.20 | 9.0 |
| " | " | n-Butyl borate | 6.40 | 16.2 |
| " | " | Boric oxide | 0.48 | 4.4 |
| " | " | Boric oxide | 0.97 | 5.5 |
| 96:4 | 3.68% | None | 0 | 238 |
| " | " | n-Butyl borate | 3.20 | 23.4 |
| " | " | n-Butyl borate | 6.40 | 20.1 |
| " | " | Boric oxide | 0.48 | 23.1 |
| " | " | Boric oxide | 0.97 | 18.6 |
| 50:50 | 3.70% | None | 0 | 400 |
| " | " | n-Butyl borate | 3.20 | about 0 |
| " | " | n-Butyl borate | 6.40 | 11.4 |
| " | " | Boric oxide | 0.48 | 2.8 |
| " | " | Boric oxide | 0.97 | 11.4 |

[a]Boron compounds were added at weights corresponding to 0.139 and 0.278 mol of boron/Kg of polymer.
[b]Weight loss in (% /min) × $10^3$.

Example 2

This example illustrates the effect of a boron compound on weight loss for polymers prepared with different catalysts.

The procedure of Example 1 was repeated. The polymerization catalyst was either lanthanum tris(2,2,6,6-tetramethylheptanedionate) diethyleneglycol diethyl ether complex in a naphtha solvent with a flash point of 60 C. (Unocal, Los Angles, Calif.) or stannous 2-ethylhexanoate (tin octoate) (50% solution in toluene). Results are given in Table 2.

TABLE 2

| Catalyst | Stabilizer | Concentration (%) | Weight Loss (% /min) × $10^3$ |
|---|---|---|---|
| La | None | 0 | 173 |
| La | Boric oxide | 1.0 | about 0 |
| La | n-Butyl borate | 1.0 | 2.0 |
| Sn | None | 0 | 60.2 |
| Sn | Boric oxide | 1.0 | 84.1 |
| Sn | n-Butyl borate | 6.6[a] | 73.6 |
| Sn | n-Butyl borate | 13.2[c] | 23.9 |
| Sn | n-Butyl borate | 26.4[c] | 25.4 |

[a]Boron concentration equivalent to 1% boric oxide.
[b]Boron concentration equivalent to 2% boric oxide.
[c]Boron concentration equivalent to 4% boric oxide.

Example 3

This example illustrates the effect of stabilizer concentration on weight loss.

The procedure of Example 1 was repeated using poly(lactic acid) prepared from a 98% L-lactide and 2% D-lactide. Residual lactide was 3.75%. The polymer was doped with varying amounts of n-butyl borate. Results are given in Table 3.

TABLE 3

| Stabilizer | Concentration[a] | Weight Loss[b] |
|---|---|---|
| None | 0.0% | 193 |
| n-Butyl borate | 0.16% | 70.9 |
| n-Butyl borate | 0.32% | 37.0 |
| n-Butyl borate | 0.64% | 15.6 |
| n-Butyl borate | 1.52% | 11.6 |
| n-Butyl borate | 3.00% | 7.0 |

TABLE 3-continued

| Stabilizer | Concentration[a] | Weight Loss[b] |
|---|---|---|
| n-Butyl borate | 6.08% | 12.5 |

[a]Concentration expressed as concentration of $B_2O_3$.
[b]Weight loss in (% /min) × $10^3$.

Example 4

This example illustrates the effect of boric oxide on the change in molecular weight during thermal processing.

Poly(lactic acid) was prepared by polymerization of L-lactide (L/D=100) with a lanthanum catalyst or with a tin catalyst. Samples containing 1% boron oxide were prepared by physically blending powdered boron oxide with a sample of each of polymer.

Samples were thermally processed in a CSI model CS-194-A-113, single scroll mini-extruder. The temperatures (both cylinder barrel and header die) were set at about 180 C. with about 160 rpm applied to the scroll. To facilitate processing about 100 g of material was forced into the extruder by a wood plunger. Processing was carried out for about 20 min.

Number average molecular weight ($M_n$) and weight average molecular weight ($M_w$) determined by gel permeation chromatography using poly(styrene) standards for each of the unprocessed polymers and for the processed polymers. Results are given in Table 4.

TABLE 4

| | La catalyst | | Sn catalyst | |
|---|---|---|---|---|
| Polymer | $M_n$ | $M_w$ | $M_n$ | $M_w$ |
| Unprocessed | 61,100 | 115,000 | 133,000 | 243,000 |
| 1% Boric oxide | 55,300 | 121,000 | 93,500 | 183,000 |
| No additive | 43,000 | 86,500 | 80,500 | 150,000 |

Example 5

This example illustrates stabilization of a lanthanum containing poly(hydroxy acid) by a boron compound.

Preparation of Catalyst-Free Polymer

Poly(lactic acid) (130 g), prepared from 100% L-lactide as described in Example 1, was dissolved in 1.17 Kg of dichloromethane and stirred with an aqueous solution of 10.45 g of the disodium salt of ethylenediamine tetraacetic acid and 4.72 g of sodium bicarbonate. After about 0.5 hr of stirring, the aqueous layer (pH 7.5) was decanted. The dichloromethane solution was stirred with a solution of 3.5 g of the disodium salt of ethylenediamine tetraacetic acid in about 400 mL of distilled water for 20 min (pH about 4.5). The aqueous layer was decanted. The dichloromethane solution was stirred for 5 rain with 0.4 L of distilled water (pH 4.0). The distilled water layer was discarded and the washing repeated with 0.4 L of distilled water. The dichloromethane solution was centrifuged to remove the remaining emulsified water (pH about 3).

The dichloromethane solution was placed in a large stainless steel beaker, equipped with a propeller stirrer and an Epinbach high speed emulsifying mixer. Spectral grade methanol (2.4 L) was added slowly with both propeller mixing and slow mixing by the Epinbach mixer, until about half of the methanol was added. The Epinbach mixing speed was then increased to provide vigorous agitation and the rest of the methanol was added over 1 hr. Poly(lactic acid) precipitated as a fine white powder. It was collected with suction in a Buchner funnel and washed with 250 mL of spectral grade methanol. The poly(lactic acid) was dried in a 3 L flask on a rotary evaporator at 40 C. about 23,00 Pa for 24 hr followed by drying in a vacuum oven at 65 C. at the same pressure. Analyses are given in Table 5.

TABLE 5

| | Poly(lactic acid) | |
|---|---|---|
| | Before Extraction | After Extraction |
| Molecular Weight[a] | | |
| $M_w$ | 135,000 | 134,000 |
| $M_n$ | 64,400 | 67,400 |
| P/D | 2.01 | 2.00 |
| Residual Lactide (%) | 7.48 | 0.0 |
| Lanthanum Content[b] (ppm) | 440 | less than 10 |

[a]Determined in tetrahydrofuran with a poly(styrene) standard.
[b]Determined by inductively coupled plasma analysis.

Doping of the Catalyst-Free Polymer

Catalyst-free polymer (2.6 g) was dissolved in 23.4 g of dichloromethane in a 20 mL screw cap vial by rolling on a roller. To this solution was added 130 microliter of 0.28 M lanthanum tris(2,2,6,6-tetra-methylheptanedionate) diethyleneglycol diethylether complex in a naphtha solvent with a flash point of 60 C., and the vials rolled for an additional 20 min. Aliquots of this solution (2.5 g) were transferred to 20 mL screw cap vials and the amounts of tri-n-butyl borate indicated in Table 6 added. These solutions were rolled an additional for 20 min, cast into aluminum pans, and dried as described in Example 1. The rate of thermal degradation was determined as described in Example 1. Results are shown in Table 6.

TABLE 6

| Moles La per Kg of polymer | Moles of B per mole of La | Weight Loss (% /min) × 10³ |
|---|---|---|
| 0.0 | 0.0 | −0.6 |
| 0.0139 | 0.0 | 31.1 |
| 0.0139 | 1.0 | 26.4 |
| 0.0139 | 2.5 | 4.0 |
| 0.0139 | 5.0 | 1.2 |
| 0.0139 | 10.0 | 1.6 |
| 0.0139 | 20.0 | 0.8 |

Example 6

This example illustrates stabilization of a tin containing poly(hydroxy acid) by a boron compound.

The catalyst-free polymer of Example 5 was doped with stannous 2-ethylhexanoate and tri-n-butyl borate and evaluated as described in Example 5. The onset of extensive degradation was delayed by about 10, 25, and 50 minutes for samples containing tri-n-butyl borate to tin in the ratios of 10:1, 20:1, and 40:1, respectively. Results given in Table 7 were determined from the weight loss observed over the greatest period of time on heating for 1 hr at 200 C.

TABLE 7

| Moles Sn per Kg of polymer | Moles of B per mole of Sn | Weight Loss (% /min) × 10³ |
|---|---|---|
| 0.00000 | 0.0 | −0.06 |
| 0.00694 | 0.0 | 45.3 |
| 0.00694 | 2.0 | 60.0 |
| 0.00694 | 5.0 | 71.5 |
| 0.00694 | 10.0 | 89.1 |
| 0.00694 | 20.0 | 1.91 |
| 0.00694 | 40.0 | 1.17 |

TABLE 7-continued

| Moles Sn per Kg of polymer | Moles of B per mole of Sn | Weight Loss (% /min) × 10³ |
|---|---|---|
| 0.00694 | 80.0 | 0.36 |

Example 7

This example illustrates the effect of a boron compound on weight loss and molecular weight of a poly(hydroxy acid) during thermal processing.

The catalyst-free polymer of Example 5 was doped with lanthanum tris(2,2,6,6-tetramethylheptanedionate) diethyleneglycol diethylether complex and tri-n-butyl borate and evaluated as described in Example 5. Thermogravimetric analysis was run on normal sized samples (about 15 mg) and on a larger samples (about 35 mg). At the end of the run, the larger sample was quickly heated to melt the remaining poly(lactic acid), transferred to a small vial, weighed, and submitted for molecular weight determination. Weight loss was determined on the smaller sample. Results are shown in Table 8.

TABLE 8

| Lanthanum Catalyst (moles/Kg) | Molar Ratio Tri-n-Butyl Borate/La | Weight Loss (% /min) × 10³ | Molecular Weight | |
|---|---|---|---|---|
| | | | $M_w$ | $M_n$ |
| 0.0000[a] | — | — | 134,000 | 67,000 |
| 0.0000 | 0.0 | −0.6 | 111,000 | 28,300 |
| 0.0138 | 0.0 | 33.0 | 29,700 | 12,300 |
| 0.0138 | 20:1 | 1.1 | 73,800 | 30,500 |

[a]Catalyst-free polymer before thermal processing.

Example 8

This example illustrates stabilization of a poly(hydroxy acid) by a variety of boron compounds.

Samples of poly(lactic acid) obtained from a 98:2 mixture of L-lactide and D-lactide were prepared and evaluated as described in Example 1 except that boric oxide was added as a 5% solution in absolute ethanol and boric acid was added as a 10% solution in absolute ethanol. Each boron compound was added at the level of 0.0695 moles of boron per kilogram of polymer, The residual lactide level was 3.75%. Results of are shown in Table 9.

TABLE 9

| Stabilizer | Concentration (% by Wt) | Weight Loss (% /min) × 10³ |
|---|---|---|
| None | 0.00 | 82.6 |
| Boric Oxide | 0.242 | 10.8 |
| Boric Acid | 0.294 | 15.9 |
| n-Butyl borate | 1.60 | 7.2 |
| t-Butyl borate | 1.60 | 6.2 |
| n-Propyl borate | 1.31 | 8.0 |
| Trimethoxyboroxine[a] | 0.402 | 6.5 |

[a]$(CH_3O)_3B_3O_3$.

Having described the invention, we now claim the following and their equivalents.

What is claimed is:

1. A composition with improved thermal stability comprising:
 (A) a poly(hydroxy acid) selected from the group of poly(lactic acid); poly(glycolic acid); copolymers of lactic and glycolic acid; and copolymers containing lactic acid and/or glycolic acid copolymerized with up to 30% by weight of an additional hydroxy acid; and (B) an effective amount of a thermal stabilizer, selected from the group consisting of: boron oxide, boric acids and mixtures thereof.

2. The composition of claim 1 wherein the amount of stabilizer is equivalent to 0.04–1.75 moles of boron/Kg of poly(hydroxy acid).

3. The composition of claim 2 additionally comprising traces of polymerization catalyst, said catalyst containing a metal selected from the group consisting of tin, lanthanum, and the rare earths.

4. The composition of claim 1 wherein the poly(hydroxy acid) is selected from the group consisting of poly(lactic acid) and copolymers containing lactic acid and up to 30% by weight of an additional hydroxy acid selected from the group consisting of glycolic acid, 3-hydroxypropanic acid, 2,2-dimethyl-3-hydroxypropanic acid, 5-hydroxypentanoic acid, 6-hydroxyhexanoic acid and its methyl substituted derivatives, 12-hydroxydodecanoic acid, and 2-(2-hydroxyethyl)-glycolic acid.

5. The composition of claim 2 wherein the amount of stabilizer is equivalent to 0.1–1.0 moles of boron/Kg of poly(hydroxy acid).

6. The composition of claim 5 wherein the stabilizer is boric oxide.

7. The composition of claim 6 wherein the poly(hydroxy acid) is poly(lactic acid).

8. A method for processing a poly(hydroxy acid) selected from a group consisting of poly(lactic acid); poly(glycolic acid); copolymers of lactic and glycolic acid; and copolymers containing lactic acid and/or glycolic acid copolymerized with up to 30% by weight of an additional hydroxy acid, the method comprising heating the composition of claim 1 to 130–215 C. for a period of 30 seconds to 2 hours.

9. The method of claim 8 wherein the poly(hydroxy acid) is selected from the group consisting of: poly(lactic acid); poly(glycolic acid); copolymers of lactic and glycolic acid; and copolymers containing lactic acid and/or glycolic acid copolymerized with up to 30% by weight of an additional hydroxy acid.

10. The method of claim 9 wherein the composition additionally comprises traces of polymerization catalyst, said catalyst containing a metal selected from the group consisting of tin, lanthanum, and the rare earths.

11. The method of claim 10 wherein the amount of stabilizer is equivalent to 0.04–1.75 moles of boron/Kg of poly(hydroxy acid).

12. The method of claim 8 wherein the poly(hydroxy acid) is selected from the group consisting of poly(lactic acid) and copolymers containing lactic acid and up to 30% by weight of an additional hydroxy acid selected from the group consisting of glycolic acid, 3-hydroxypropanic acid, 2,2-dimethyl-3-hydroxypropanic acid, 5-hydroxypentanoic acid, 6-hydroxyhexanoic acid and its methyl substituted derivatives, 12-hydroxydodecanoic acid, and 2-(2-hydroxyethyl)-glycolic acid.

13. The method of claim 12 wherein the amount of stabilizer is equivalent to 0.1–1.0 moles of boron/Kg of poly(hydroxy acid).

14. The method of claim 13 wherein the stabilizer is boric oxide.

15. The method of claim 14 wherein the poly(hydroxy acid) is poly(lactic acid).

16. The method of claim 13 wherein heating is carried out at 155–185 C. for 3 to 15 minutes.

17. A method for stabilizing a poly(hydroxy acid) selected from a group consisting of poly(lactic acid); poly(glycolic acid); copolymers of lactic and glycolic acid; and copolymers containing lactic acid and/or glycolic acid copolymerized with up to 30% by weight of an additional hydroxy acid to thermal processing, the method comprising mixing the poly(hydroxy acid) and an effective amount of a thermal stabilizer selected from the group consisting of: boron oxide, boric acids and mixtures thereof.

18. The method of claim 17 wherein the poly(hydroxy acid) is selected from the group consisting of: poly(lactic acid); poly(glycolic acid); copolymers of lactic and glycolic acid; and copolymers containing lactic acid and/or glycolic acid copolymerized with up to 30% by weight of an additional hydroxy acid.

19. The method of claim 18 wherein the composition additionally comprises traces of polymerization catalyst, said catalyst containing a metal selected from the group consisting of tin, lanthanum, and the rare earths.

20. The method of claim 19 wherein the amount of stabilizer is equivalent to 0.04–1.75 moles of boron/Kg of poly(hydroxy acid).

21. The method of claim 17 wherein the amount of stabilizer is equivalent to 0.1–1.0 moles of boron/Kg of poly(hydroxy acid).

22. The method of claim 21 wherein the stabilizer is boric oxide.

23. The method of claim 22 wherein the poly(hydroxy acid) is poly(lactic acid).

* * * * *